(12) United States Patent
Zhang et al.

(10) Patent No.: US 7,339,767 B1
(45) Date of Patent: Mar. 4, 2008

(54) BASEPLATE FOR A DISK DRIVE HEAD SUSPENSION

(75) Inventors: Yiduo Zhang, Plymouth, MN (US); Raymond R. Wolter, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 304 days.

(21) Appl. No.: 10/942,389

(22) Filed: Sep. 16, 2004

(51) Int. Cl.
*G11B 5/48* (2006.01)

(52) U.S. Cl. .............................. 360/244.6; 360/244.4; 360/244.5

(58) Field of Classification Search ... 360/244.3–244.6
See application file for complete search history.

(56) References Cited

U.S. PATENT DOCUMENTS

| | | | |
|---|---|---|---|
| 5,689,389 A | 11/1997 | Braunheim | |
| 5,717,545 A * | 2/1998 | Brooks et al. | 360/244.6 |
| 6,033,755 A | 3/2000 | Hanrahan et al. | |
| 6,183,841 B1 | 2/2001 | Hanrahan et al. | |
| 6,424,497 B1 | 7/2002 | Coon | |
| 6,697,224 B2 | 2/2004 | Wang et al. | |
| 7,042,680 B1 * | 5/2006 | Zhang et al. | 360/244.6 |
| 7,190,555 B2 * | 3/2007 | Hanrahan et al. | 360/244.6 |
| 2006/0023363 A1 * | 2/2006 | Hanrahan et al. | 360/244.6 |

* cited by examiner

*Primary Examiner*—Angel Castro
*Assistant Examiner*—Christopher R. Magee
(74) *Attorney, Agent, or Firm*—Faegre & Benson LLP

(57) ABSTRACT

A baseplate for swaging a head suspension to an actuator arm includes a flange with an opening having a back bore diameter and a boss tower extending from the flange and having an outer diameter. The back bore diameter is less than or equal to about 105% of the outer diameter and greater than or equal to about 90% of the outer diameter.

4 Claims, 3 Drawing Sheets

BASEPLATE FOR A DISK DRIVE HEAD SUSPENSION

FIELD OF THE INVENTION

The present invention relates generally to disk drive head suspension assemblies. More specifically, the invention is a baseplate for mechanically swaging a head suspension assembly to an actuator arm.

BACKGROUND OF THE INVENTION

Swage baseplates are commonly used in disk drive or other dynamic data storage systems to attach head suspensions to actuator arms. Examples of these attachment structures and associated assembly methods for magnetic disk drives are disclosed in U.S. Pat. No. 6,697,224 (Wang), U.S. Pat. No. 6,033,755 (Hanrahan) and U.S. Pat. No. 6,183,841 (Hanrahan), all of which are incorporated herein by reference.

Briefly, baseplates include a generally flat flange and a tubular boss tower extending from the flange. The boss tower is hollow and has an inner diameter defining a swaging opening and an outer diameter sized to fit within an opening in the actuator arm to which the suspension is to be mounted. The flange also has an opening generally concentric with the swaging opening and defined by a secondary inner or back bore diameter. The boss tower inner diameter is typically smaller than the back bore diameter. A shoulder area defines a transition from the larger flange opening to the smaller swaging opening.

The flange is typically welded to a mounting region of the suspension. An actuator arm having an opening therethrough is positioned over the boss tower so that the actuator opening and the boss tower are concentrically aligned. During the swaging process a ball is forced from the flange opening through the swaging opening in the boss tower, bending the boss tower outwardly at the shoulder area, thereby forcing the outer surface of the boss tower into frictional engagement with an inner surface of the opening in the actuator arm. This is known as torque retention. The baseplate and attached suspension are thereby securely fastened to the actuator arm. Unfortunately, this swaging process can result in deformation of the baseplate flange section, and in turn the suspension to which the baseplate is mounted. This deformation can cause changes in the desired positional orientation of the suspension, known as z-height variations, and changes to the desired spring characteristics of the suspension, know as gram changes. These swaging-induced z-height variations and gram changes can detrimentally affect the operational performance of the suspension.

Attempts have been made in the past to address the above described problems associated with swaging-induced z-height variations and gram changes. U.S. Pat. No. 6,424,497 (Coon) teaches that where the inner diameter of the bore (boss tower) is about 95-99% of the diameter of the flange opening, swaging induced deformations are reduced.

Swaging baseplates generally protrude somewhat from the mounted actuator arm. Swaging baseplates that have a low-profile, or that protrude minimally from the actuator arm, are desirable as they have less mass and take up less space in the suspension assembly, permitting smaller assemblies or allowing more room for other components. However, reduction in baseplate profile generally reduces the torque retention provided by the swaged baseplate. The strength of the coupling between the actuator arm and the suspension assembly is thereby undesirably weakened.

Attempts have been made to design a low profile baseplate capable of maintaining adequate torque retention. U.S. Pat. No. 5,689,389 (Braunheim) teaches that the swage mount vertical profile may be reduced by a factor of three while still maintaining adequate torque retention where the inner diameter of the hub (boss tower) is at least 85% of the baseplate opening diameter, but no greater than the baseplate opening diameter. U.S. Pat. No. 6,183,841 (Hanrahan, et. al.) teaches that a low profile swage mount is achievable where:

$$W_h/T_{bp}*W_h/((H_{is}+H_h-H_{cb})/2) \geq 5$$

$W_h$ is the hub radial width, $T_{bp}$ is the base plate thickness, $H_{is}$ is the hub inner surface depth, $H_h$ is the overall height and $H_{cb}$ is the counter bore depth.

However, a need still exists for a swaging assembly that withstands transfer of deformation from the boss tower to the baseplate flange area. The baseplate must also be capable of maintaining sufficient torque retention while displaying a low vertical profile.

SUMMARY OF THE INVENTION

According to one embodiment, the present invention is a baseplate for swaging a head suspension to an actuator arm. The baseplate has a flange with an opening defining a back bore diameter. A boss tower having an outer diameter extends from the flange. The back bore diameter is less than or equal to about 105% of the outer diameter and greater than or equal to about 90% of the outer diameter.

DETAILED DESCRIPTION OF THE PREFERRED EMBODIMENTS

Figure 1:
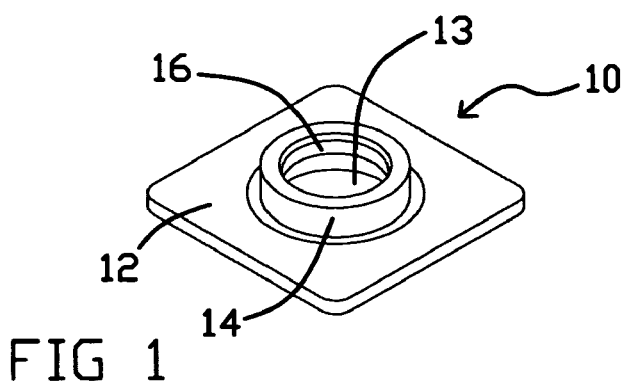
FIG. 1 is an isometric view of one embodiment of a baseplate in accordance with the present invention.

FIG. 1 is an illustration of a baseplate 10 that can be configured in accordance with the present invention to produce relatively little or minimal swaging-induced deformation. As shown, baseplate 10 includes a generally flat flange 12 having a flange opening 13. A tubular boss tower 14 extends from flange 12 and has a swaging hole 16 extending therethrough. The swaging hole 16 is continuous with the flange opening 13. Baseplate 10 is typically manufactured from stainless steel by stamping processes as is well-known in the art, although other materials and manufacturing methods are contemplated.

Figure 2:
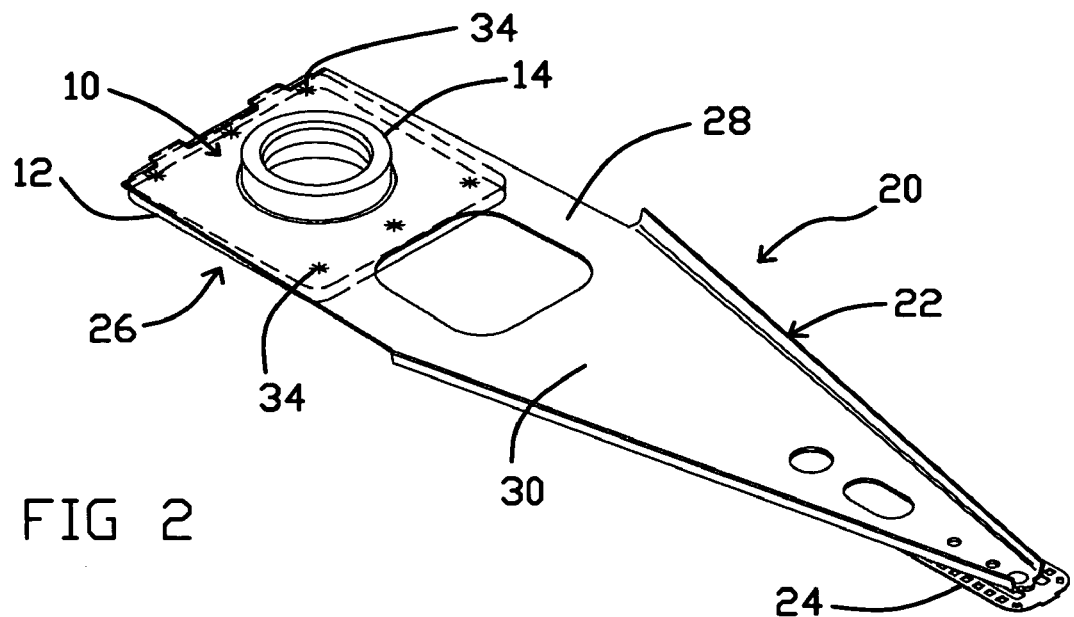
FIG. 2 is an isometric view of the baseplate shown in FIG. 1 mounted to a suspension.

FIG. 2 is an illustration of the baseplate 10 of FIG. 1 mounted to a suspension 20 in accordance with one embodiment of the present invention. Suspension 20 includes a load beam 22 having a flexure 24 to which a read/write head (not shown) is mountable. Load beams such as load beam 22 are typically manufactured from stainless steel using etching and forming processes, and include a proximal mounting region 26, a radius or spring region 28 and a distal beam or rigid region 30. Flange 12 of baseplate 10 is attached to the mounting region 26 of load beam 22, typically by welds 34. The flexure 24, which can be an integrated lead or wireless flexure, may be mounted to the load beam 22 as shown or, in other embodiments (not shown), formed as an integral element of the load beam 22. Load beams 22 and flexures 24 such as illustrated in FIG. 2 are well known in the art. However, it is contemplated that the present invention can be used in connection with any suitable conventional or otherwise known load beam and flexure.

Figure 3:
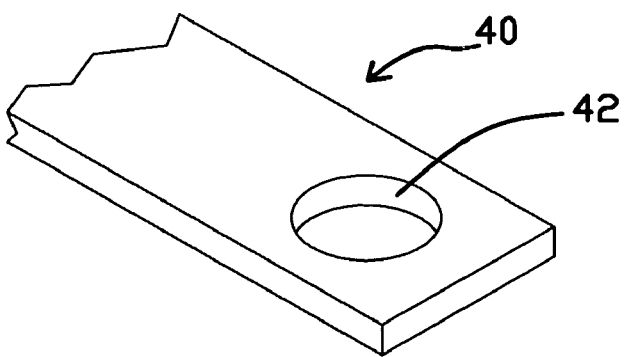
FIG. 3 is an isometric view of a portion of an actuator arm mountable to the suspension and baseplate of FIG. 2.

The suspension 20 is mountable at the mounting region 26 to an actuator arm 40 via the baseplate 10. FIG. 3 shows a portion of actuator arm 40 to which suspension 20 can be attached. Arms such as 40 are well known. By way of example, arm 40 can be the arm portion of an E-block or C-block, or a separate arm element stamped or otherwise formed from aluminum, stainless steel or other materials. As shown, arm 40 includes an interior hole 42 into which boss tower 14 of suspension 20 is inserted and swaged.

Figure 4:
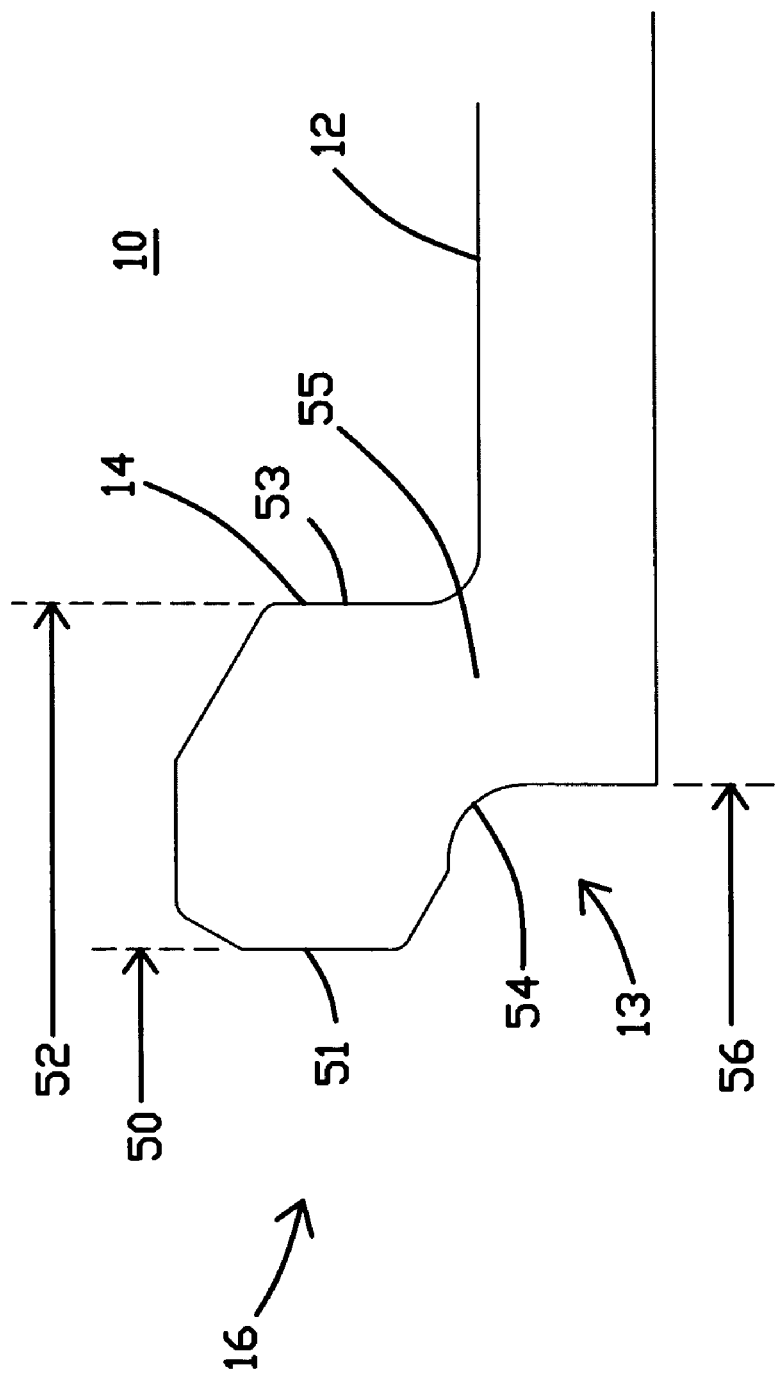
FIG. 4 is a cross sectional view detailing a portion of the baseplate shown in FIG. 1.

FIG. 4 is a detailed partial cross sectional view of the baseplate 10 of FIG. 1 according to one embodiment of the present invention. Boss tower 14 has an inner surface 51 and an outer surface 53. The outer surface 53 defines an outer diameter 52 of the boss tower 14 while the inner surface 51 defines an inner diameter 50 of the swaging hole 16. The flange opening 13 is characterized by a secondary inner or back bore diameter 56. Secondary inner diameter 56 is generally larger than inner diameter 50 so as to accommodate the swaging ball (not shown) without deformation of the flange 12. The transition from swaging opening 16 to flange opening 13 forms a shoulder area 54. As the swaging ball is forced through flange opening 13, the boss tower 14 is deformed outwardly at shoulder area 54. Deformation at shoulder area 54 brings the outer surface 53 of boss tower 14 into a tight interference fit with the interior hole 42 of the actuator arm 40 (FIG. 3), creating a secure, high torque connection. Preferably, deformation at shoulder area 54 during the swaging process should cause minimal or no deformation at flange 12, as any such deformation can cause undesirable z-height variations and gram changes in the suspension 20.

According to one embodiment of the present invention, as shown in FIG. 4, shoulder area 54 defines a neck 55 protruding from flange 12 and coupling boss tower 14 to flange 12. The outer diameter 52 (OD) of the boss tower 14 is generally equal to the secondary inner diameter 56 (SID) of the flange opening 13 such that the outer surface of boss tower 14 is generally co-linear with the inner surface of the flange opening 13. A baseplate 10 in accordance with the present embodiment, as shown in FIG. 4, provides a neck 55 having a reduced volume and mass, and having a generally axis symmetric shape. Neck 55 is deformable generally independently of flange 12 and exerts minimal or no influence on flange 12. Thus, movement of the boss tower 14 during the swaging process produces minimal or no amounts of strain transfer to flange 12, thus reducing undesirable deformation of flange 12.

Figure 5:
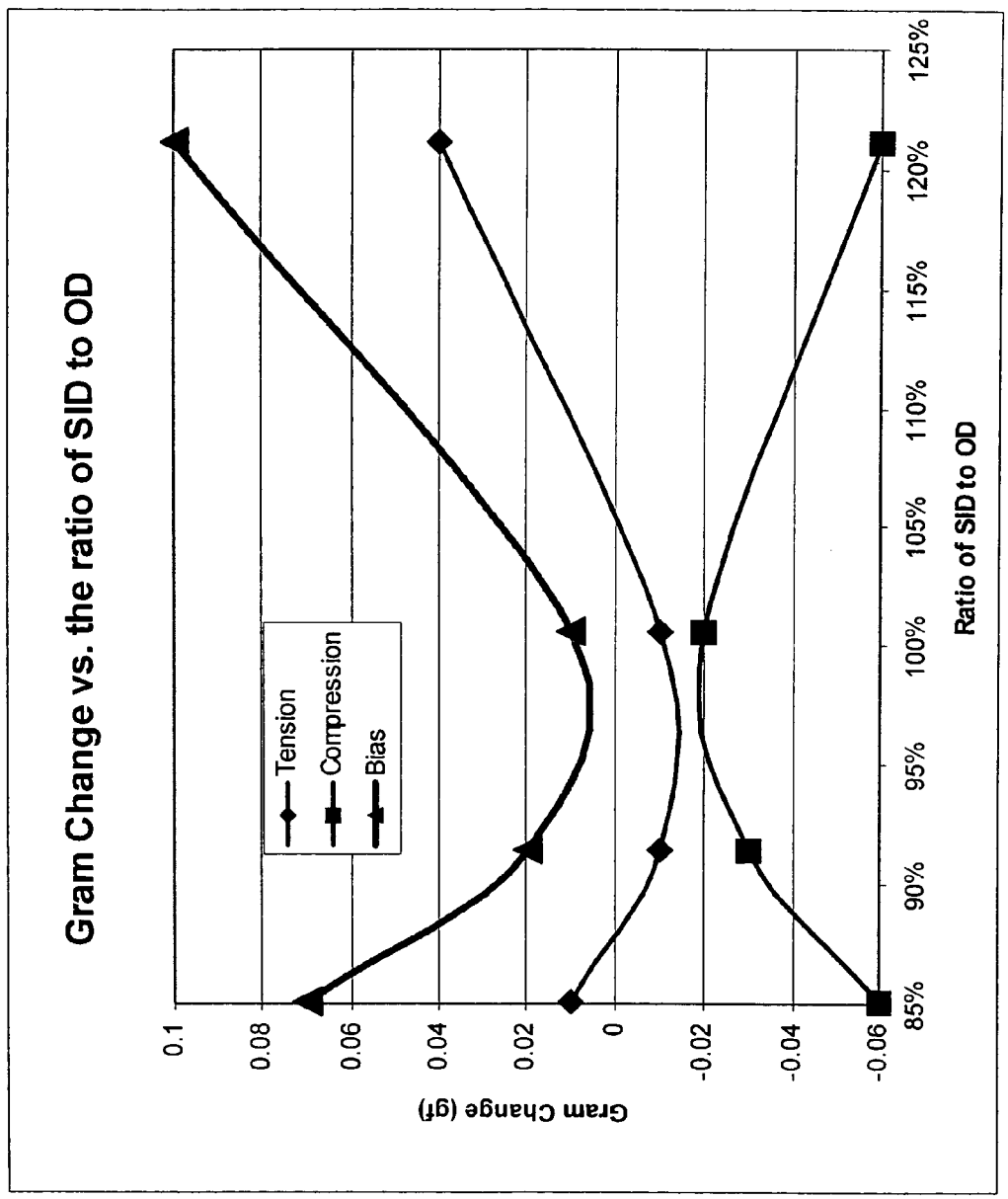
FIG. 5 is a graph of the modeled gram changes versus the ratio of the secondary inner diameter to the outer diameter provided by a baseplate in accordance with the present invention.

FIG. 5 is a graph of a modeled analysis of the gram changes of the suspension 20 in grams force (gf) versus the ratio of the secondary inner diameter 56 (SID) to the outer diameter 52 (OD) of the boss tower 14. As illustrated, tension, compression and bias are all at a minimum gram change when the ratio of the secondary inner diameter 56 (SID) to the outer diameter 52 (OD) of the boss tower 14 approaches between 90% and 105%.

According to one embodiment of the present invention, the secondary inner diameter 56 of the flange opening 13 is generally greater than or equal to 90% of the outer diameter 52 of the boss tower 14 and generally less than or equal to 105% of the outer diameter 52 of the boss tower 14.

According to a preferred embodiment of the present invention, the secondary inner diameter 56 of the flange opening 13 is generally greater than 95% of the outer diameter 52 of the boss tower 14 and generally less than 103% of the outer diameter 52 of the boss tower 14. According to a more preferred embodiment of the present invention, the outer diameter 52 of the boss tower 14 is generally equal to the secondary inner diameter 56 of the flange opening 13.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A baseplate for swaging a head suspension to an actuator arm, the baseplate comprising:
    a flange having an opening defining a back bore diameter; and
    a boss tower extending from the flange and having an outer diameter, wherein the back bore diameter is less than or equal to about 103% of the outer diameter and greater than or equal to about 95% of the outer diameter.

2. The baseplate of claim 1 wherein the back bore diameter is equal to about 100% of the outer diameter.

3. The baseplate of claim 1 and further including an arm, and the baseplate is swaged to the arm.

4. A baseplate for swaging a disk drive head suspension to an arm, the baseplate having a first surface with an opening therethrough, the opening having an opening diameter, and a second surface having a boss tower extending therefrom, the boss tower having an outer diameter, wherein the boss tower outer diameter is less than 103% of the opening diameter and greater than or equal to 95% of the opening diameter.

* * * * *